United States Patent
Saha et al.

(10) Patent No.: US 8,813,236 B1
(45) Date of Patent: Aug. 19, 2014

(54) DETECTING MALICIOUS ENDPOINTS USING NETWORK CONNECTIVITY AND FLOW INFORMATION

(71) Applicant: Narus, Inc., Sunnyvale, CA (US)

(72) Inventors: Sabyasachi Saha, Sunnyvale, CA (US); Lei Liu, East Lansing, MI (US); Ruben Torres, Sunnyvale, CA (US); Jianpeng Xu, East Lansing, MI (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 0 days.

(21) Appl. No.: 13/735,196

(22) Filed: Jan. 7, 2013

(51) Int. Cl.
*G06F 12/14* (2006.01)
*H04L 29/06* (2006.01)
*H04L 12/22* (2006.01)
*H04L 9/00* (2006.01)

(52) U.S. Cl.
CPC .... *H04L 29/06857* (2013.01); *H04L 29/06904* (2013.01); *H04L 9/002* (2013.01)
USPC .................. 726/25; 726/22; 726/23

(58) Field of Classification Search
CPC combination set(s) only.
See application file for complete search history.

(56) References Cited

PUBLICATIONS

Self-Learning Peer-to-Peer Traffic Classifier. Keralpura et al. IEEE(2009).*
Traffic monitor depolyment in IP networks. Zang et al. Elsevier(2009).*
Monitoring of Spatial-Aggregated Ip-Flow Records. Wagner et al. Springer(2010).*
Gu, Guofei et al., "BotMiner: clustering analysis of network traffic for protocol-and structure-independent botnet detection." In Proceedings of the 17th Conference on Security Symposium, pp. 139-154. 2008.
Chau, D.H. et al., "Polonium: Tera-scale graph mining and inference for malware detection". Proceedings of SIAM International Conference on Data Mining (SDM), 131-142, Apr. 2011.
Krishnan, Vijay et al., "Web spam detection with anti-trust rank". In Proceedings of the 2nd International Workshop on Adversarial Information Retrieval on the Web (AIRWeb), pp. 37-40. 2006.

* cited by examiner

*Primary Examiner* — Venkat Perungavoor
(74) *Attorney, Agent, or Firm* — Fernandez & Associates, LLP

(57) ABSTRACT

A method for detecting hidden malicious network nodes. Starting from a pool of seed nodes that have previously been identified as malicious, a two-phase score propagation algorithm is employed to propagate threat scores from the seeded nodes to other nodes in an IP-address connectivity graph. Nodes with high threat score after propagation are declared to be malicious.

20 Claims, 5 Drawing Sheets

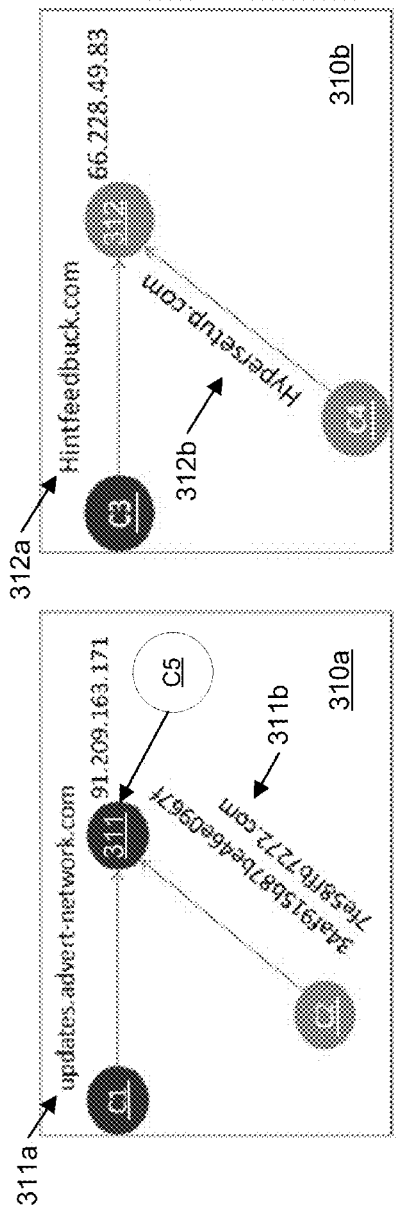
FIG. 3.1
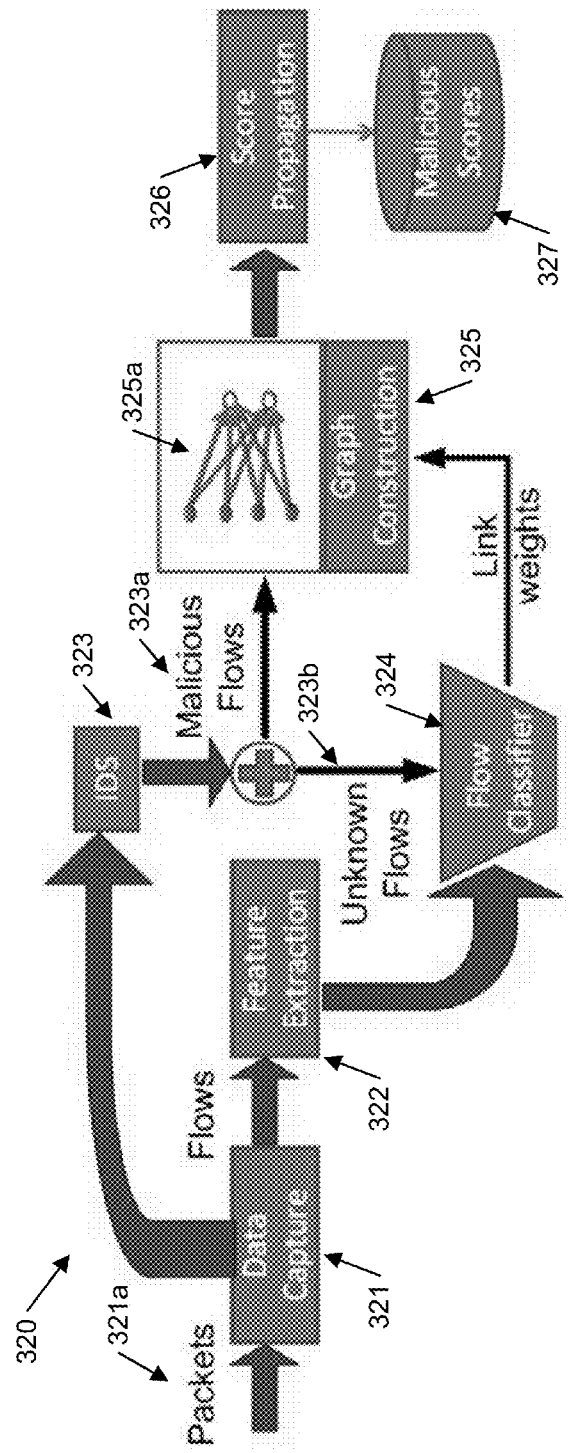
FIG. 3.2

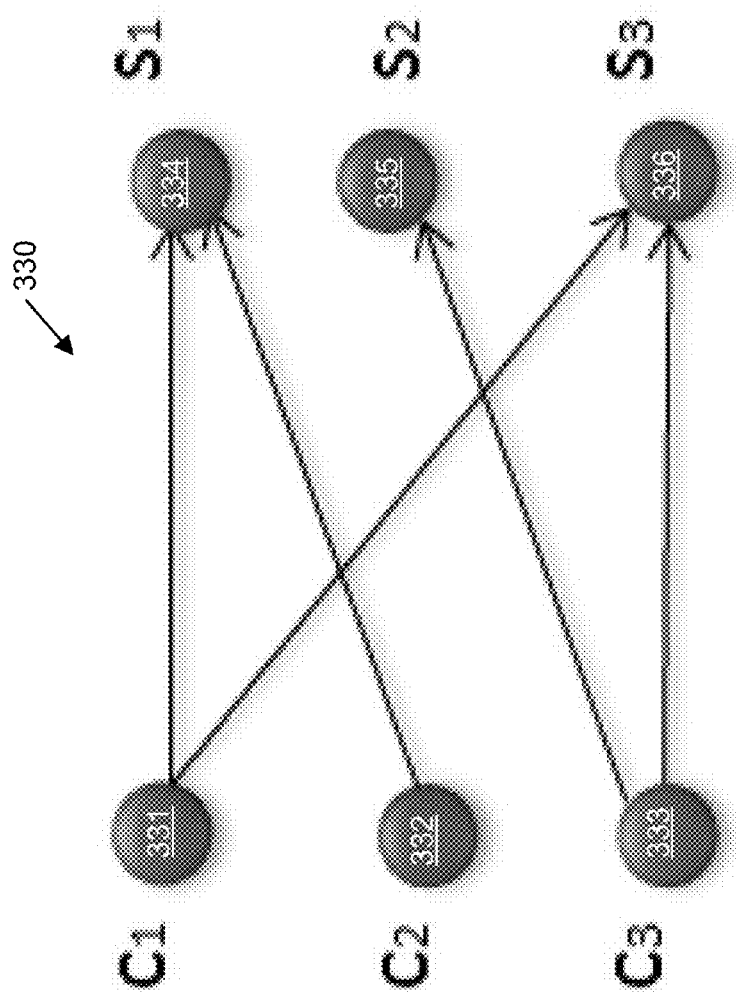
FIG. 3.3

DETECTING MALICIOUS ENDPOINTS USING NETWORK CONNECTIVITY AND FLOW INFORMATION

BACKGROUND OF THE INVENTION

Web attacks have been on the rise for the last few years. Sophisticated botnets have been widely used to coordinate spam campaigns, launch denial-of-service attacks, or steal sensitive information. Increasingly, the bot activities are coordinated via sophisticated and stealthy command-and-control (C&C) channels designed to evade detection by traditional signature-based Intrusion Detection and Prevention Systems (IDS/IPS). C&C channels employ various stealth techniques, such as (i) the use of HTTP protocols to bypass firewalls, (ii) encryption to obscure payloads, (iii) "domain fast-flux" to constantly change locations of the command and control servers, etc., making them difficult to detect.

Recent approaches to identify Web attacks rely on analysis of the content of the downloaded files or the URLs used in the communication. Since they do not consider the network communication graph, they often fall short in identifying other malicious activities in the network. Further, existing IDS can only identify malicious clients associated with known malwares whose threat signatures are available. The main limitation is in identifying zero-day malwares for which the IDS do not have their corresponding signatures.

SUMMARY

In general, in one aspect, the present invention relates to a method for detecting a malicious endpoint in a network. The method includes obtaining, from the network, flows among a plurality of endpoints of the network, wherein the plurality of endpoints comprise servers and clients, assigning, to each of the plurality of endpoints, a pre-identified endpoint threat level specific to each of the plurality of endpoints, assigning, to each of the flows, a pre-identified flow threat level specific to each of the flows, calculating, by a computer processor, for a server and a client in the plurality of endpoints, and based on the pre-identified flow threat level assigned to a flow between the server and the client, a server-to-client (SC) score propagation parameter and a client-to-server (CS) propagation parameter, performing, by the computer processor, iterative score propagation, comprising (i) initializing, prior to an initial iteration, the client score and the server score according to the pre-identified endpoint threat levels assigned to the client and the server, respectively, (ii) updating, in a first iteration, a client score of the client by a SC adjustment amount determined at least based on a server score of the server and the SC score propagation parameter, (iii) updating, in a second iteration, the server score of the server by a CS adjustment amount determined at least based on the client score of the client and the CS score propagation parameter, and (iv) generating, in response to at least updating the client score and the server score in the first iteration and the second iteration, respectively, the final scores of the plurality of endpoints based on at least the client score and the server score, and detecting an endpoint of the plurality of endpoints as malicious in response to a corresponding one of the final scores exceeding a pre-determined threshold, wherein the endpoint is not identified as malicious based on the pre-identified endpoint threat level assigned to the endpoint.

In general, in one aspect, the present invention relates to a system for detecting a malicious endpoint in a network. The system includes a computer processor, a flow parser configured to obtain, from the network, flows among a plurality of endpoints of the network, wherein each of the plurality of endpoints is assigned a pre-identified endpoint threat level specific to each of the plurality of endpoints, wherein each of the flows is assigned a pre-identified flow threat level specific to each of the flows, wherein the plurality of endpoints comprise servers and clients, a connectivity analyzer executing on the computer processor and configured to calculate, for a server and a client in the plurality of endpoints, and based on the pre-identified flow threat level assigned to a flow between the server and the client, a server-to-client (SC) score propagation parameter and a client-to-server (CS) propagation parameter, an iterative score calculator executing on the computer processor and configured to perform iterative score propagation comprising (i) initializing, prior to an initial iteration, the client score and the server score according to the pre-identified endpoint threat levels assigned to the client and the server, respectively, (ii) updating, in a first iteration, a client score of the client by a SC adjustment amount determined at least based on a server score of the server and the SC score propagation parameter, (iii) updating, in a second iteration, the server score of the server by a CS adjustment amount determined at least based on the client score of the client and the CS score propagation parameter, and (iv) generating, in response to at least updating the client score and the server score in the first iteration and the second iteration, respectively, the final scores of the plurality of endpoints based on at least the client score and the server score, a malicious endpoint detector executing on the computer processor and configured to detect an endpoint of the plurality of endpoints as malicious in response to a corresponding one of the final scores exceeding a pre-determined threshold, wherein the endpoint is not identified as malicious based on the pre-identified endpoint threat level assigned to the endpoint, and a repository configured to store the pre-identified endpoint threat level, the pre-identified flow threat level, the SC score propagation parameter, the CS score propagation parameter, the server score, the client score, and the final scores.

In general, in one aspect, the present invention relates to a non-transitory computer readable medium embodying instructions for profiling network traffic of a network. The instructions when executed by a processor comprising functionality for obtaining, from the network, flows among a plurality of endpoints of the network, wherein the plurality of endpoints comprise servers and clients, assigning, to each of the plurality of endpoints, a pre-identified endpoint threat level specific to each of the plurality of endpoints, assigning, to each of the flows, a pre-identified flow threat level specific to each of the flows, calculating, by a computer processor, for a server and a client in the plurality of endpoints, and based on the pre-identified flow threat level assigned to a flow between the server and the client, a server-to-client (SC) score propagation parameter and a client-to-server (CS) propagation parameter, performing, by the computer processor, iterative score propagation, comprising (i) initializing, prior to an initial iteration, the client score and the server score according to the pre-identified endpoint threat levels assigned to the client and the server, respectively, (ii) updating, in a first iteration, a client score of the client by a SC adjustment amount determined at least based on a server score of the server and the SC score propagation parameter, (iii) updating, in a second iteration, the server score of the server by a CS adjustment amount determined at least based on the client score of the client and the CS score propagation parameter, and (iv) generating, in response to at least updating the client score and the server score in the first iteration and the second iteration, respectively, the final scores of the plurality of endpoints based on at least the client score and the server score, and detecting an endpoint of the plurality of endpoints as malicious in response to a corresponding one of the final scores exceeding a pre-determined threshold, wherein the endpoint is not identified as malicious based on the pre-identified endpoint threat level assigned to the endpoint.

Other aspects and advantages of the invention will be apparent from the following description and the appended claims.

BRIEF DESCRIPTION OF DRAWINGS

FIGS. 3.1-3.3 show various examples according to aspects of the invention.

DETAILED DESCRIPTION

Figure 1:
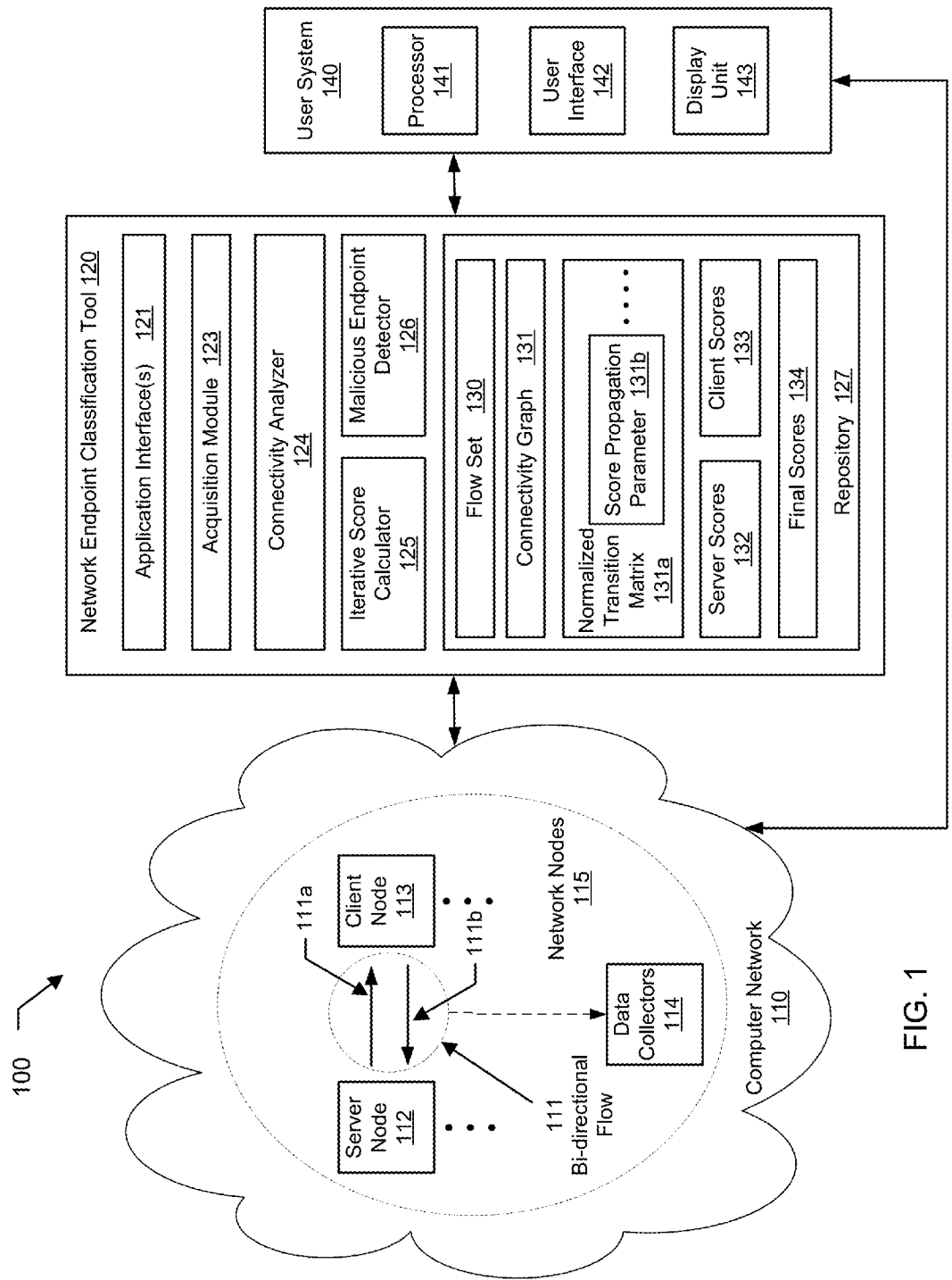
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called the endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Multiple flows captured for analysis are referred to as a flow set or network trace. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

Embodiments of the invention provide a method, system, and computer readable medium to detect malicious network endpoints using an IP-address connectivity graph. In one or more embodiments, the IP-address connectivity graph is used to identify the botnets by detecting patterns of their communication back to the C&C servers. In one or more embodiments, the IP-address connectivity graph is used to identify hidden malicious clients beyond those found by an IDS. For example, to detect botnet or other hidden malicious activities exploiting the HTTP communication, the IP-address connectivity graph may be based on HTTP flows in the monitored network and is referred to as HTTP communication graph. In other examples, similar techniques can also be applied to detect malicious servers not identified by the IDS or other classification means.

In one or more embodiments, HTTP flows between the clients and servers are represented as a directed, near-bipartite graph, where the nodes correspond to the clients and servers and the links represent their inter-connectivity. Starting from a pool of seed nodes that have been identified as malicious (e.g., by an IDS), a two-phase score propagation algorithm is employed to propagate threat scores from the seeded nodes to other nodes in the IP-address connectivity graph. Nodes with high threat score after propagation are declared to be malicious.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network endpoint classification tool (120), a user system (140), and a computer network (110). The network endpoint classification tool (120) includes data repository (127), one or more application interfaces (121), acquisition module (123), connectivity analyzer (124), iterative score calculator (125), and malicious endpoint detector (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (115), such as server node (112), client node (113), data collectors (114), etc., which are devices configured with computing and communication capabilities for executing applications in the network (110).

As shown in FIG. 1, the server node (112) and client node (113) communicate with each other by exchanging data packets forming bi-directional flows, such as the bi-directional flow (111), which includes two uni-directional flows (111a) and (111b) represented by two arrows. In one or more embodiments, the server node (112) and the client node (113) exchange data packets in the bi-directional flow (111) as a result of an application executing on the server node (112) and the client node (113). In this context, the bi-directional flow (111) is referred to as being generated by the application executing on the server node (112) and client node (113). For example, the source IP address in the 5-tuple of the uni-directional flow (111a) and the destination IP address in the 5-tuple of the unit-direction flow (111b) are both the IP address of the server node (112), referred to as the server IP address. The destination IP address in the 5-tuple of the uni-directional flow (111a) and the source IP address in the 5-tuple of the unit-direction flow (111b) are both the IP address of the client node (113), referred to as the client IP address. The source port in the 5-tuple of the uni-directional flow (111a) and the destination port in the 5-tuple of the unit-direction flow (111b) are both the port of the server node (112), referred to as the server port. The destination port in the 5-tuple of the uni-directional flow (111a) and the port in the 5-tuple of the unit-direction flow (111b) are both the port of the client node (113), referred to as the client port. Further, the server port and the transport protocol in both 5-tuples are characteristics of the application executing on the server node (112) and the client node (113).

As noted above, a portion of the network nodes (115) may be infected by attackers to involve in malicious activities, such as an attack exploiting HTTP communication. An example of malicious HTTP based attacks is depicted in FIG. 3.1. Specifically, FIG. 3.1 shows two example connectivity graphs (i.e., graph (310a) and graph (310b)), which may be a portion of a larger HTTP communication graph constructed from the network trace. Each node in these two sub-graphs, which corresponds to a server or a client IP address, had been initially classified as "malicious" or "unknown" (collectively referred to as binary malicious status) based on the flow classification provided by an IDS. Specifically, the node is labeled malicious if at least one of its incoming or outgoing flows matches the threat signature used by the IDS. Otherwise, the node is labeled as unknown.

In the example shown in the graph (310a), client (C1) and client C2) established HTTP connections to the same server (311) at IP address 91.209.163.171. The client (C1) had been classified as malicious while the client (C2) as unknown. The malicious client (C1) initiates an HTTP flow to the server (311) requesting a resource associated with the hostname (311a). The HTTP flow was flagged as malicious by the IDS because it matches a threat signature tracked by the IDS. In the meantime, the client (C2) also initiates an HTTP connection to the same server (311) for a resource associated with the hostname (311b). The payloads for the two HTTP connections are identical and that their connections differ only in hostnames, causing the potentially malicious flow from the client (C2) goes undetected the IDS. Thus, by relying only on the IDS, where the flows are analyzed independently without considering the HTTP communication graph, the malware infection of the client (C2) is not detected. Throughout this disclosure, any hostname or URL (e.g., hostname (311a), hostname (311b), etc.) is treated as a text string without referring to any specific website content thereof.

In the example shown in the graph (310b), the clients (C3) and client (C4) had contacted a server (312) at IP address 66.228.49.83. All the flows from the two clients (C3) and (C4) to the server (312) were classified as unknown by the IDS. The client (C3) was classified as malicious by the IDS because its connections to another server (not shown) were found to be infected by a known Trojan. On the other hand, none of the flows associated with the client (C4) to other hosts were malicious according to the IDS. Upon closer inspection, the client (C3) was found to have repeatedly established HTTP connections to the website (312a) hosted by the server (312) and posted encrypted content. There had been reports that showed the website (312a) is frequently visited by clients infected with a known malware. The client (C4) also repeatedly contacted a website (312b) hosted by the same server (312) and downloaded the same files. Further, the website (31b) is frequently visited by other clients infected with another known malware. This should raise suspicion that the client (C4) is potentially malicious. Without considering both the HTTP connectivity graph and its flow-level information, the IDS fails to raise the threat level for C4.

The examples shown in FIG. 3.1 illustrate the limitations of using only IDS-based signatures for detecting malicious ISP clients. A simple approach to enhance the detection would be to flag all clients that are connected to the malicious servers as suspicious. However, this would considerably increase the number of suspicious clients to be inspected and elevate the false alarm rate. For example, a client (C5) may also be contacting the server (311) located at 91.209.163.171 but with a different (possibly benign) network flow payload. In this scenario, the threat level for the client (C5) should be lower than the client (C2), which initiates HTTP flows to the server with similar payload as the malicious client (C1). As note above, in one or more embodiments, the threat level score of the clients are adjusted based on the HTTP communication graph, taking into consideration flow similarities between the client (C1) and (C2). The server (311), server (312), and clients (C1)-(C5) shown in this example are schematically represented as network nodes (115), such as server node (112), client node (113), etc. in FIG. 1. Further, the HTTP flows shown as arrows in this example are schematically represented as bi-directional flows and/or uni-directional flows, such as the bi-directional flow (111) and the uni-directional flows (111a) and (111b) contained therein, etc. in FIG. 1.

FIG. 3.2 shows an example solution (320) to relieve the limitation of IDS-only detection illustrated in FIG. 3.1 above. Specifically, the example solution (320) adjusts the threat level (i.e., a measure to represent malicious status) of the clients based on the HTTP communication graph. The threat level may be represented as a score referred to as a malicious score. Using the example solution (320), the hidden malicious client (e.g., client (C2) and (C4) shown in FIG. 3.1 above) not identified by the IDS can be detected. For example, the example solution (320) may be installed at the edge of an ISP network or enterprise network, focusing on the detection of hidden malicious clients inside the monitored network. As shown in FIG. 3.2, the solution (320) uses a Semantic Traffic Analyzer (STA) (321) to capture the HTTP traffic flows for analysis. The captured flows (321a) are passed through an intrusion detection system (IDS) (323), which is responsible for labeling the flows as malicious (323a) if their payload matches one of the pre-defined signatures. Otherwise, the unmatched flows (323b) are designated as "unknown". Both the malicious flows (323a) and unknown flows (323b) are sent to the graph construction module (325), which creates a weighted directed graph (325a) using the IP addresses of clients and servers as nodes and the flows between them as links. The weights of the links are determined in two ways: (1) a binary 0/1 weight based on the existence of a flow between the client and server and (2) a non-negative, continuous-valued weight based on the output of the flow-based classifier (324). The example graph construction process creates a large graph and updating the weights of the edges from the output of the flow-based classifier (324). In one or more embodiments, the graph construction is done offline and highly parallelized. The graph is updated periodically and assumed to be static within a time period up to its next update. The threat levels of the client nodes (referred to as client score) are determined by a two-phase score propagation algorithm (326). The nodes are initially classified using labels (corresponding to the aforementioned binary malicious status) assigned by the IDS (325). Their initial threat levels (i.e., IDS assigned labels) are then propagated to neighboring nodes in the HTTP communication graph (326), where the propagated scores depend on both the degrees of the nodes as well as the malicious level of their flow information. The propagation is repeated until a maximum number of iterations is reached or when the final malicious scores (327) converge. The solution (320) described above is an example of using the network endpoint classification tool (120) of FIG. 1. The example components shown in FIG. 3.2 and how the example solution (320) may be used by an ISP administrator user are described in further details in reference to FIG. 1 below.

Returning to the discussion of FIG. 1, in one or more embodiments, certain device(s) (e.g., data collectors (114)) within the computer network (110) may be configured to collect network data (e.g., bi-directional flow (111)) for providing to the network endpoint classification tool (120). Each of these components is described below. One of ordinary skill in the art will appreciate that embodiments are not limited to the configuration shown in FIG. 1.

In one or more embodiments of the invention, the network endpoint classification tool (120) is configured to interact with the computer network (110) using one or more of the application interface(s) (121). The application interface (121) may be configured to receive data (e.g., bi-directional flow (111)) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network endpoint classification tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network endpoint classification tool (120). The user may include, but is not limited to, an individual, a group, an organization, or some other entity having authority and/or responsibility to access the network endpoint classification tool (120). Specifically, the context of the term "user" here is distinct from that of a user of the computer network (110). The user system (140) may be, or may contain a form of, an internet-based communication device that is capable of communicating with the application interface (121) of the network endpoint classification tool (120). Alternatively, the network endpoint classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network endpoint classification tool (120) (e.g., report, alert, etc.).

As shown, communication links are provided between the network endpoint classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network endpoint classification tool (120), the user system (140), and the communication links may be part of the computer network (110).

In one or more embodiments, a central processing unit (CPU, not shown) of the network endpoint classification tool (120) is configured to execute instructions to operate the components of the network endpoint classification tool (120). In one or more embodiments, the memory (not shown) of the network endpoint classification tool (120) is configured to store software instructions for analyzing the network trace to construct traffic models, extract features, generating classification signatures/criteria, and classifying new flows captured from the network traffic, for example to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network endpoint classification tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network endpoint classification tool (120) is configured to obtain and store data in the data repository (127), such as flow set (130), connectivity graph (131), transition matrix (311a), score propagation parameter (131b), server scores (132), client scores (133), final scores (134), etc. In one or more embodiments, the data repository (127) is a persistent storage device (or set of devices) and is configured to receive data from the computer network (110) using the application interface (121). The data repository (127) is also configured to deliver working data to, and receive working data from, the acquisition module (123), connectivity analyzer (124), iterative score calculator (125), and malicious endpoint detector (126). The data repository (127) may be a data store (e.g., a database, a file system, one or more data structures configured in a memory, some other medium for storing data, or any suitable combination thereof), which may include information related to the network traffic classification. The data repository (127) may be a device internal to the network endpoint classification tool (120). Alternatively, the data repository (127) may be an external storage device operatively connected to the network endpoint classification tool (120).

In one or more embodiments, the network endpoint classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network endpoint classification tool (120) is configured to support various data formats provided by the user system (140).

In one or more embodiments, the network endpoint classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as flow set (130), etc.

In one or more embodiments, a flow parser (e.g., acquisition module (123) in conjunction with data collectors (114)) reconstructs (e.g., eliminates redundant packets, collates packets into a correct sequence, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments, endpoints (i.e., servers or clients) of the flow set (130) (i.e., servers and clients identified from flows in the flow set (130)) may be assigned a pre-identified endpoint threat level specific to each endpoint. For example, the pre-identified endpoint threat level may be specified according to the binary malicious status (e.g., malicious or unknown) assigned by the IDS. Similarly, the flows in the flow set (130) may be assigned a pre-identified flow threat level specific to each flow. For example, the pre-identified flow threat level may be specified according to the binary malicious status (e.g., malicious or unknown) assigned by the IDS (not shown). For example, the nodes assigned a malicious status may be used as the aforementioned seed nodes, from which the two-phase score propagation algorithm propagates the malicious scores to other nodes assigned the unknown status.

In addition, a flow-based classifier (not shown) is used to classify flows that are assigned as unknown by the IDS. The flow-based classifier may detect suspicious flows whose characteristics resemble those of known malwares but are missed by the IDS. Further, the flow-based classifier produces a continuous-valued output that reflects the likelihood or probability of a flow to be malicious. In one or more embodiments, the pre-identified endpoint threat level and the pre-identified flow threat level are normalized to have a range between 0 and +1 and referred to as the malicious score of a link.

In one or more embodiments, the connectivity analyzer (124) is configured to calculate, for a server and a client, and based on the pre-identified flow threat level assigned to a flow between the server and the client, a server-to-client (SC) score propagation parameter and a client-to-server (CS) score propagation parameter. These score propagation parameters are used to instantiate the aforementioned two-phase score propagation algorithm to update threat level scores for at least those nodes assigned as unknown by the IDS. Specifically, the calculated values of the SC score propagation parameter and the CS score propagation parameter are used for the SC phase and CS phase, respectively, of the two-phase score propagation algorithm.

In one or more embodiments, the SC score propagation parameter and the CS score propagation parameter (e.g., score propagation parameter (131b)) are calculated from matrix elements in a normalized transition matrix (131a) of the aforementioned IP-address connectivity graph (e.g., connectivity graph (131)). Specifically, the connectivity analyzer (124) first generates the connectivity graph (131) to represent flows, servers, and clients found in the flow set (130). In other words, the connectivity graph (131) includes server nodes, client nodes, and server/client links linking the server nodes and the client nodes. Further, the pre-identified endpoint threat levels and the pre-identified flow threat levels are used to annotate the nodes and the server/client links in the connectivity graph (131). In one or more embodiments, the connectivity graph (131) annotated with the pre-identified endpoint/flow threat levels is used as the starting point to determine final scores of the server and client nodes in the flow set (130). In particular, the annotated connectivity graph (131) is used to determine the SC score propagation parameter and the CS score propagation parameter. An example of determining pre-identified endpoint/flow threat levels and annotating the connectivity graph (131) to instantiate the iterative score propagation algorithm is described mathematically below.

Let $G=(v, \epsilon)$ denote the connectivity graph (131) constructed from the flow set (130), where $V=\{v_1, v_2, \ldots, v_n\}$ is the set of nodes corresponding to the IP addresses of the clients and servers and $\epsilon$ is the set of links between the nodes. Each node $v_i$ is associated with a numeric score $y_i \geq 0$ that represents its threat level. Scores associated with servers (or server nodes) are referred to as server scores (e.g., server scores (132)). Similarly, scores associated with clients (or client nodes) are referred to as client scores (e.g., client scores (133)). In one or more embodiments, an initial score $y_i^0$ is assigned to the node $v_i$ based on an IDS. For example, $y_i^0$ is based on the IDS classification of flows associated with the node $v_i$. If one of its flows is flagged as malicious by the IDS, then $y_i^0$ is initialized to 1. Otherwise, $y_i^0$ is initialized to zero. The initial score $y_i^0$ is referred to as the pre-identified endpoint threat level of the node $v_i$. In one or more embodiments, the iterative score propagation algorithm is instantiated using the pre-identified endpoint threat levels of the server nodes, the client nodes, or a combination of both server nodes and client nodes.

Generally, the majority of the nodes derived from typical network trace are either servers or clients, with few nodes (e.g., less than 0.3%) being server/client combo-nodes have both incoming links (i.e., combo-node acting as client) and outgoing links (i.e., combo-node acting as server). Therefore, the connectivity graph (131) is almost bipartite (referred to as near-bipartite) with the exception of these few combo-nodes. In one or more embodiments, the connectivity graph (131) is converted into a bipartite graph by splitting each combo-node into a client node associated with the combo-node's outgoing link and a server node associated with the combo-node's incoming link. In one or more embodiments, the connectivity graph (131) is reduced into a bipartite graph by removing the incoming links from the graph, removing the outgoing links from the graph, or removing these few combo-nodes with all incoming and outgoing links from the graph.

In one or more embodiments, where the connectivity graph (131) is a bipartite graph, each link of the bipartite graph is a directed link. In one or more embodiments, the directed link $e_{ij}$ is an ordered pair of client and server nodes $(v_i, v_j)$, where the leading node in the client/server pair is the client node $v_i$ and the trailing node is the server node $v_j$. In this context, the link $e_{ij}=(v_i, v_j)$ is an outgoing link for the client $v_i$ where the client node $v_i$ is referred to as the head of the link $e_{ij}$. Further, the link $e_{ij}=(v_i, v_j)$ is an incoming link for the server node $v_j$ where the server node $v_j$ is referred to as the tail of the link $e_{ij}$. In one or more embodiments, the bipartite connectivity graph (131) is associated with a client-to-server (CS) transition matrix $\hat{W}^{(CS)}=\{\hat{W}^{(CS)}_{ij}\}$ and a server-to-client (SC) transition matrix $\hat{W}^{(SC)}=\{\hat{W}^{(SC)}_{ji}\}$, collectively referred to the normalized transition matrix (131a).

In one or more embodiments, the connectivity analyzer (124) is configured to generate the normalized transition matrix (131a) from the connectivity graph (1310. In particular, the matrix elements $\hat{W}^{(CS)}_{ij}$ and $\hat{W}^{(SC)}_{ji}$ are the aforementioned CS score propagation parameter and the SC score propagation parameter, respectively, of the corresponding client/server pair $(v_i, v_j)$. In one or more embodiments, the CS score propagation parameter $\hat{W}^{(CS)}_{ij}$ and the SC score propagation parameter $\hat{W}^{(SC)}_{ij}$ are collectively referred to as score propagation parameter (e.g., score propagation parameter (131b)) and are computed by normalizing a link weight $w_{ij}$ of the link $e_{ij}=(v_i, v_j)$. Example formulae used by the connectivity analyzer (124) for calculating the CS score propagation parameter $\hat{W}^{(CS)}_{ij}$ and the SC score propagation parameter $\hat{W}^{(SC)}_{ij}$ of the link $e_{ij}=(v_i, v_j)$ are shown below.

$$\hat{W}^{(CS)}_{ij} = w_{ij}/\Sigma_k w_{ik} \quad (1)$$

$$\hat{W}^{(SC)}_{ji} = w_{ij}/\Sigma_k w_{kj} \quad (2)$$

In the equations (1) and (2), $w_{ij}$ denotes a weight assigned to the link $e_{ij}=(v_i, v_j)$. Assigning the weight $w_{ij}$ to each link of the connectivity graph (131) is described below. While both the CS propagation parameter score propagation parameter $\hat{W}^{(CS)}_{ij}$ and the SC score propagation parameter $\hat{W}^{(SC)}_{ji}$ are based on the same link weight $w_{ij}$ of the link $e_{ij}=(v_i, v_j)$, the CS score propagation parameter $\hat{W}^{(CS)}_{ij}$ is normalized with respect to all link weights ($\Sigma_k w_{ik}$) associated with the client $v_i$. In contrast, the SC score propagation parameter $\hat{W}^{(SC)}_{ji}$ is normalized with respect to all link weights ($\Sigma_k w_{kj}$) associated with the server $v_j$.

In one or more embodiments, weights assigned to the links of the connectivity graph (131) are determined using a combination of two schemes to represent threat levels of flows associated with the links. As noted above, $G=(v, \epsilon)$ denote the connectivity graph (131) where $\epsilon$ is the set of links between the nodes. In the flow set (130), each link $e_{ij}=(v_i, v_j) \in \epsilon$ is associated with a set of flows $\tau_{ij}=\{f_{ij1}, f_{ij2}, \ldots, f_{ij|\tau_{ij}|}\}$ where $f_{ijk}$ denotes the kth flow between the client/server pair $(v_i, v_j)$ and $|\tau_{ij}|$ denotes a number of flows between the client/server pair. Accordingly, if $\tau_{ij}=0$, then $(v_i, v_j) \notin \epsilon$.

(I) Connectivity-based weight $w_{ij}^{(l)}$: In this scheme, the weight of the link $e_{ij}=(v_i, v_j)$ depends on the existence of a flow between the node pair:

$$w_{ij}^{(l)} = \begin{cases} 1, & \text{if } (v_i, v_j) \in \varepsilon (\text{or } \pi_{ij} \neq \emptyset) \\ 0, & \text{otherwise} \end{cases} \quad (3)$$

(II) Flow-based weight $w_{ij}^{(f)}$: In this scheme, the link weight depends on the pre-identified flow threat level of its flows. First, an IDS is used to classify the flows associated with the link. If any of the flows $f_{ijk}$ is flagged as malicious, then the link weight is set to 1. Otherwise, a flow-based classifier is invoked. Let $\Sigma_{ij}=\{\sigma_1, \sigma_2, \ldots, \sigma_{|\tau_{ij}|}\}$ be the classification outputs of the flow-based classifier when applied to the flows in the $\tau_{ij}$ between the client/server pair $(v_i, v_j)$.

In one or more embodiments, the weight of the link $e_{ij}=(v_i, v_j)$ is given by the larger of the connectivity-based weight $w_{ij}^{(l)}$ and the flow-based weight $w_{ij}^{(f)}$ or mathematically, $w_{ij}=\max(w_{ij}^{(l)}, w_{ij}^{(f)})$. Specifically, the link weight is computed as follows:

$$w_{ij}^{(f)} = \begin{cases} 1, & \text{if } \exists\, f_{ijk} \in \pi_{ij} : I(f_{ijk}) = 1 \\ \max_{\sigma_k, \in \Sigma_{ij}} \{\sigma_k\}, & \text{otherwise} \end{cases} \quad (4)$$

where $\mathcal{I}(\bullet)$ denote the output of the IDS, which is equal to 1 if the flow is flagged as malicious and zero otherwise. The weight $w_{ij}$ of the link $e_{ij}=(v_i, v_j)$ is referred to as the pre-identified flow threat level of the link $e_{ij}$.

In one or more embodiments, the network endpoint classification tool (120) includes the iterative score calculator (125) that is configured to calculate endpoint scores taking into consideration threat levels (i.e., the scores) of their neighbors, which in turn depend on the scores of their respective neighbors, and so on. An example of the aforementioned two-phase score propagation algorithm (referred to as iterative score propagation algorithm) used by the iterative score calculator (125) is described mathematically below.

Let $y=\{y_i\}$ be a column vector (referred to as the endpoint score vector) where each vector element $y_i$ represents the score of a node $v_i$ (server node or client node) in the connectivity graph (131) and $y^0=\{y_i^0\}$ be its initial value. In particular, the scores of the nodes in the connectivity graph (131) correspond to threat levels of endpoints in the flow set (130). As noted above, the initial threat levels are determined from the labeling results of an IDS. In one or more embodiments, the endpoint score vector $y=\{y_i\}$ is decomposed into the client score vector $y^{(c)}$ and the server score vector $y^{(s)}$, respectively, for the two disjoint sets of nodes (i.e., clients and servers) in the bipartite connectivity graph (131). The corresponding portions in $y^0=\{y_i^0\}$ are $y^{(c)(0)}$ and $y^{(s)(0)}$, respectively. The iterative score propagation algorithm iteratively updates the score of a node based on its initial threat level and the weighted average of the scores for its neighbors. In one or more embodiments, during each iteration, the column vector y is updated using the following equations.

$$y^{(c)} = \beta \hat{W}^{(sc)} y^{(s)} + (1-\beta) y^{(c)(0)} \quad (5)$$

$$y^{(s)} = \beta \hat{W}^{(cs)} y^{(c)} + (1-\beta) y^{(s)(0)} \quad (6)$$

The parameter $\beta$ controls the relative contribution from the initial vector $y^0$ assigned by the IDS versus the relative contribution from the neighbors' scores according to the link connectivity. For example, if $\beta=1$, the score of a node depends only on the scores of its neighbors. In one or more embodiments, $\beta=0.85$.

In one or more embodiments, the iterative score calculator (125) iteratively updates the server score vector and client score vector in a two-phase alternating scheme. During the client propagation phase of the iteration, the scores of the clients (i.e., client score vector) are propagated to the servers by following the clients' outgoing links. During the server propagation phase of the iteration, the scores of the servers (i.e., server score vector) are propagated to the clients in the reverse direction (i.e., by traversing in the opposite direction of the servers' incoming links). In one or more embodiments, where the connectivity graph (131) is bipartite, the nodes are either clients or servers, their scores are updated only once in each iteration (during the client or server propagation phases). In other scenarios, where some nodes are both clients and servers, their scores are updated twice during each iteration to take into account the malicious scores of their neighboring servers and clients. The iterations continue until the changes in scores introduced at a new iteration are no longer significant, for example, less than a pre-determined minimum threshold. The server score vector and/or the client score vector are then finalized and stored in the repository (127) as the final scores (134) of the endpoints.

In one or more embodiments, the network endpoint classification tool (120) includes the malicious endpoint detector (126) that is configured to detect an endpoint identified in the flow set (130) based on the final scores generated by the iterative score calculator (125). For example, an endpoint previously not identified as malicious (i.e., assigned the unknown status) by the IDS may now be identified as malicious as a result of its final score exceeding a pre-determined threshold. In one or more embodiments, the malicious endpoint detector (126) is further configured to generate, in response to detecting at least one malicious endpoint, an alert indicating this endpoint as malicious. In one or more embodiments, the malicious endpoint detector (126) is further configured to initiate, in response to detecting at least one malicious endpoint, a security operation with respect to the endpoint. For example, any future attempts to launch malicious attacks from the identified malicious endpoint may be isolated, deactivated, or otherwise neutralized.

Figure 2:
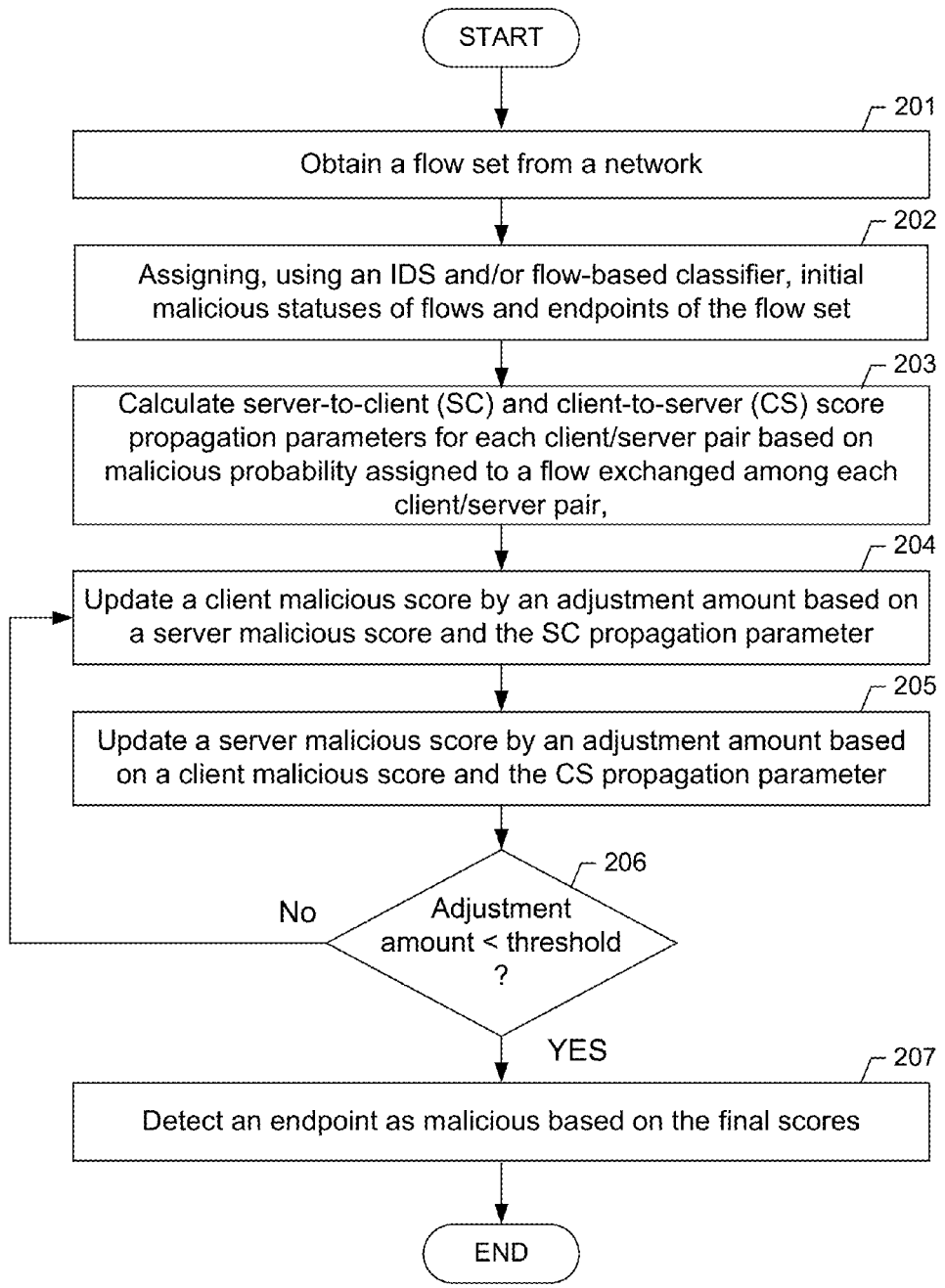
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, a flow set is obtained from a network. In one or more embodiments, the flows in the network are captured and parsed to generate the flow set throughout a pre-configured time interval recurring on a periodic basis (e.g., every minute, hourly, daily, etc.) or triggered in response to an event. Each flow in the flow set includes a server and a client that are endpoints of the network.

In Step 202, initial malicious statuses are assigned to flows and endpoints in the flow set. In one or more embodiments, the assigned malicious statuses are binary malicious scores that identify the flows and/or endpoints as either malicious or unknown. In one or more embodiments, the assigned malicious statuses may represent statistically estimated threat levels that may not be binary. For example, flows in the flow set may be analyzed using an intrusion detection system (IDS) to determine whether the flows and/or associated endpoints are malicious or benign. In another example, the flows may be analyzed using a statistical flow-based classifier to determine a non-binary probability that each flow and/or associated endpoints are malicious or benign. In yet another example, the assignment may be based on a blacklist or white-list of known malicious endpoints or benign endpoints.

In one or more embodiments, pre-identified endpoint threat levels and pre-identified flow threat levels are determined by quantifying and/or normalizing the initial malicious statuses. The pre-identified endpoint/flow threat levels may be normalized to a range between 1 and 0. In one or more embodiments, the pre-identified endpoint threat level of an endpoint is either 1 or 0 according to a corresponding binary malicious status while the pre-identified flow threat level of a flow is a non-binary probability of the flow being malicious or not.

In Step 203, for each client/server pair in the flow set, and based on the pre-identified flow threat level assigned to a flow between the server and the client of the client/server pair, a server-to-client (SC) score propagation parameter and a client-to-server (CS) score propagation parameter are calculated. Specifically, these two score propagation parameters are specific to the client/server pair and represent two separately normalized threat levels of flow(s) exchanged among the client/server pair. If multiple flows are exchanged among a single client/server pair, their pre-identified flow threat levels may be combined in the calculation. In one or more embodiments, the SC score propagation parameter is normalized with respect to all pre-identified flow threat levels associated with the client, and the CS score propagation parameter is normalized with respect to all pre-identified flow threat levels associated with the server.

In one or more embodiments, these score propagation parameters are calculated by analyzing a connectivity graph, which represents endpoint connectivity according to the flows in the flow set. For example, the connectivity graph may be analyzed to generate a weight-normalized transition matrix in the server-to-client direction where the matrix element corresponding to the client/server pair is its SC score propagation parameter. Similarly, the connectivity graph may be analyzed to generate a weight-normalized transition matrix in the client-to-server direction where the matrix element corresponding to the client/server pair is its CS score propagation parameter. In one or more embodiments, the SC score propagation parameter and CS score propagation parameter are calculated using the connectivity analyzer (124) described in reference to FIG. 1 above.

Using these calculated score propagation parameters, an iterative score propagation is performed to generate final scores of the endpoints in the iteration loop of Steps 204, 205, and 206. In one or more embodiments, the iterative score propagation is performed using the iterative score calculator (125) described in reference to FIG. 1 above. In particular, prior to an initial iteration, client malicious scores (i.e., client scores) and server malicious scores (i.e., server scores) are initialized according to the pre-identified endpoint threat levels assigned to the clients and the servers, respectively.

In Step 204, the client score of a client is updated (i.e., adjusted by a client score adjustment amount) based on one or more server scores of one or more servers that exchange any flow with the client in the flow set. In one or more embodiments, the contribution to the client score adjustment amount from each server is proportional to the SC score propagation parameter of the corresponding client/server pair. Accordingly, the client score of each client in the flow set is updated at least once during each iteration.

In Step 205, the server score of the server node is updated (i.e., adjusted by a server score adjustment amount) based on one or more client scores of one or more clients that exchange any flow with the server in the flow set. In one or more embodiments, the contribution to the server score adjustment amount from each client is proportional to the CS score propagation parameter of the corresponding client/server pair. Accordingly, the server score of each server in the flow set is updated at least once during each iteration.

In one or more embodiments, the first iteration that is performed immediately after the initialization during the initial iterations is the Step 204. In one or more embodiments, the first iteration that is performed immediately after the initialization during the initial iterations is the Step 205. In either case, Step 204 and Step 205 are performed in an alternating manner until a score convergence is determined in Step 206.

In Step 206, the client score adjustment amount of each client and the server score adjustment amount of each server are evaluated to determine whether they are less than a pre-determined convergence threshold. For example, each adjustment amount may be separately compared to a threshold. In another example, multiple adjustment amounts may be combined before the comparison. In one or more embodiments, the threshold is the same for both comparing the client score adjustment amount and comparing the server score adjustment amount. In other embodiments, the client score adjustment amount and the server score adjustment amount are compared to different thresholds.

If the determination in Step 207 is negative, i.e., the adjustment amount is not yet less than the threshold, the method returns to Step 204 where another iteration is then performed. Otherwise, the method continues to Step 207 where the server scores and client scores are finalized as the final scores after the adjustments through the iterations.

In Step 207, an endpoint (i.e., a server or a client) is detected as malicious in response to its final score exceeding a pre-determined threshold. In one or more embodiments, an endpoint that is not initially identified as malicious based on the pre-identified endpoint threat level is detected as malicious using the method described above. In one or more embodiments, an alert is generated indicating the detected endpoint as malicious. For example, the alert may be presented to a network security specialist of an ISP. In one or more embodiments, a security operation is initiated with respect to the detected endpoint. For example, the security operation may seek to isolate, deactivate, or otherwise neutralize any further malicious attach from the detected malicious endpoint.

FIG. 3.3 shows an example of detecting malicious endpoints using the system and method described above. As shown in FIG. 3.3, the bipartite connectivity graph (330) includes client nodes C1 (331), C2 (332), and C3 (333), and server nodes S1 (334), S2 (335), and S3 (336). The single ended arrows represent the directed links from the client nodes to the server nodes. Any client and server pair not connected by a directed link does not have any flows among them in the flow set under investigation. Let the initial client score vector $y^{(c)(0)}=[1,0,1]^T$, and initial server score vector $y^{(s)(0)}=[1,0,0]^T$. In other words, the IDS detects malicious flows associated with nodes C1, C3, and S1. In this example, the link weights are assumed to be 1 for simplicity. The CS transition matrix $W^{(CS)}$ and SC transition matrix $W^{(SC)}$ are computed using the equations (1) and (2) to yield the following:

$$\hat{W}^{cs} = \begin{bmatrix} \frac{1}{2} & 0 & \frac{1}{2} \\ 1 & 0 & 0 \\ 0 & \frac{1}{2} & \frac{1}{2} \end{bmatrix}, \hat{W}^{sc} = \begin{bmatrix} \frac{1}{2} & \frac{1}{2} & 0 \\ 0 & 0 & 1 \\ \frac{1}{2} & 0 & \frac{1}{2} \end{bmatrix}$$

These computed matrix element values are then substituted into equations (5) and (6) to perform the iterative score propagation. This substitution of computed matrix elements is referred to as instantiating the iterative score propagation algorithm. After applying the score propagation algorithm to the server nodes in the first iteration, the server score vector is modified from [1,0,0] to [0.575,0.425,0.85]. Observe that the score for server node S3 (336) has increased significantly because it is connected to two client nodes C1 (331) and C3 (333) that are found to be malicious. On the other hand, the malicious score for node S1 (334) has decreased since only one (i.e., C1 (331)) of the two coupled clients nodes is found to be malicious. Nevertheless, its score is still higher than that for server node S2 (335), which is connected to only one malicious client node C3 (333). This is because the score propagation algorithm updates the score of a node based on the weighted average scores of its neighbors as well as its initial score. Since the initial score for S1 (334) is higher than S2 (335), they remain the same way after the update. Similarly the client score vector are modified from [1,0,1] to [0.7556, 0.2444, 0.8725] after the first iteration. The malicious scores after the first three iterations are shown in TABLE 1. Note that S3 (336) may now be identified as malicious if the threshold for the malicious endpoint detector (126) is set at 0.5. In other words, the S3 (336) is a hidden malicious node that is discovered by the iterative score propagation algorithm.

TABLE 1

| node | initial score | iteration 1 | iteration 2 | iteration 3 |
|------|---------------|-------------|-------------|-------------|
| $c_1$ | 1 | 0.7556 | 0.7230 | 0.7220 |
| $c_2$ | 0 | 0.2444 | 0.2981 | 0.3222 |
| $c_3$ | 1 | 0.8725 | 0.8485 | 0.8253 |
| $s_1$ | 1 | 0.575 | 0.6165 | 0.6529 |
| $s_2$ | 0 | 0.425 | 0.4346 | 0.4258 |
| $s_3$ | 0 | 0.85 | 0.8195 | 0.7908 |

Figure 4:
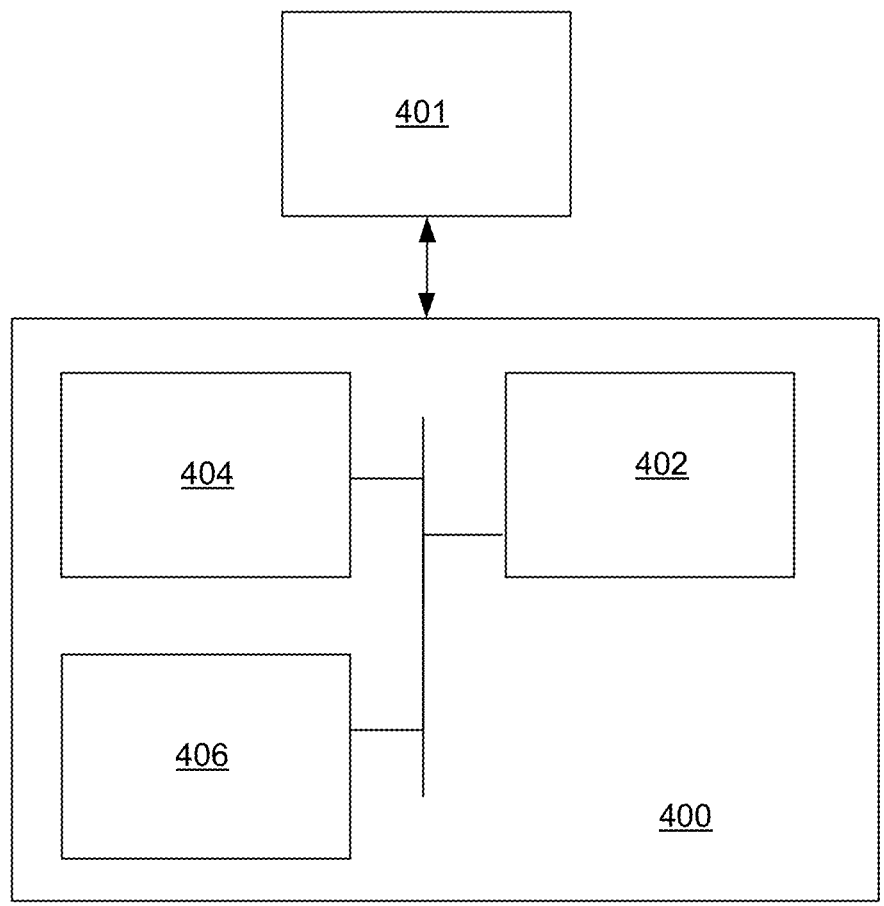
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a malicious endpoint in a network, comprising:
    obtaining, from the network, flows among a plurality of endpoints of the network, wherein the plurality of endpoints comprise servers and clients;
    assigning, to each of the plurality of endpoints, a pre-identified endpoint threat level specific to each of the plurality of endpoints;
    assigning, to each of the flows, a pre-identified flow threat level specific to each of the flows;
    calculating, by a computer processor, for a server and a client in the plurality of endpoints, and based on the pre-identified flow threat level assigned to a flow between the server and the client, a server-to-client (SC) score propagation parameter and a client-to-server (CS) propagation parameter,
    performing, by the computer processor, iterative score propagation based on a sequence of iterations, comprising:
        initializing, prior to the sequence of iterations, a client score of the client and a server score of the server according to the pre-identified endpoint threat levels assigned to the client and the server, respectively;
        updating, in a first iteration in the sequence of iterations, the client score of the client by a SC adjustment amount determined at least based on the server score of the server and the SC score propagation parameter;
        updating, in a second iteration adjacent to the first iteration in the sequence of iterations, the server score of the server by a CS adjustment amount determined at least based on the client score of the client and the CS score propagation parameter; and
        generating, in response to at least updating the client score and the server score in the first iteration and the second iteration, respectively, the final scores of the plurality of endpoints based on at least the client score and the server score; and
    detecting an endpoint of the plurality of endpoints as malicious in response to a corresponding one of the final scores exceeding a pre-determined threshold, wherein the endpoint is not identified as malicious based on the pre-identified endpoint threat level assigned to the endpoint.

2. The method of claim 1, further comprising:
    identifying, using an intrusion detection system (IDS), a binary malicious status of each of the plurality of endpoints, wherein the pre-identified endpoint threat level of the at least one endpoint is set according to at least the binary malicious status; and
    determining, using a flow-based classifier, the pre-identified flow threat level of each of the flows, wherein the pre-identified flow threat level represents a continuous-valued probability of each of the flows to be malicious.

3. The method of claim 1,
    wherein the SC score propagation parameter is normalized with respect to all pre-identified flow threat levels associated with the client, and wherein the CS score propagation parameter is normalized with respect to all pre-identified flow threat levels associated with the server.

4. The method of claim 1, further comprising:

generating a bipartite graph to represent the plurality of endpoints and the flows among the plurality of endpoints, wherein the bipartite graph comprises server nodes, client nodes, and server/client links linking the server nodes and the client nodes according to the flows; and generating a normalized transition matrix representing the server/client links of the bipartite graph, wherein transitions in the normalized transition matrix are weighted based on corresponding pre-identified flow threat levels of the server/client links, wherein calculating, for the server and the client, the SC score propagation parameter and the CS score propagation parameter comprises computing a matrix element of the normalized transition matrix in SC direction and CS direction, respectively, and wherein the matrix element corresponds to one of the server/client links linking a server node of the server and a client node of the client.

5. The method of claim 4, further comprising:

determining the SC adjustment amount by a first matrix multiplication between a server score vector and the transition matrix in SC direction, wherein the server score vector comprises all server scores of all servers in the plurality of endpoints; and determining the CS adjustment amount by a second matrix multiplication between a client score vector and the transition matrix in CS direction, wherein the client score vector comprises all client scores of all clients in the plurality of endpoints.

6. The method of claim 1, wherein performing the iterative score propagation further comprises:

updating the client score and the server score in at least a third iteration and a fourth iteration, respectively, wherein the final scores are generated further in response to at least one selected from a group consisting of the SC adjustment amount and CS adjustment amount being less than a convergence threshold.

7. The method of claim 1, further comprising:

generating, in response to the detecting, an alert indicating the endpoint as malicious; and initiating, in response to the detecting, a security operation with respect to the endpoint.

8. A system for detecting a malicious endpoint in a network, comprising:

a computer processor;

a flow parser configured to obtain, from the network, flows among a plurality of endpoints of the network, wherein each of the plurality of endpoints is assigned a pre-identified endpoint threat level specific to each of the plurality of endpoints, wherein each of the flows is assigned a pre-identified flow threat level specific to each of the flows, wherein the plurality of endpoints comprise servers and clients;

a connectivity analyzer executing on the computer processor and configured to:

calculate, for a server and a client in the plurality of endpoints, and based on the pre-identified flow threat level assigned to a flow between the server and the client, a server-to-client (SC) score propagation parameter and a client-to-server (CS) propagation parameter;

an iterative score calculator executing on the computer processor and configured to perform iterative score propagation based on a sequence of iterations, comprising:

initializing, prior to the sequence of iterations, a client score of the client and a server score of the server according to the pre-identified endpoint threat levels assigned to the client and the server, respectively;

updating, in a first iteration in the sequence of iterations, the client score of the client by a SC adjustment amount determined at least based on the server score of the server and the SC score propagation parameter;

updating, in a second iteration adjacent to the first iteration in the sequence of iterations, the server score of the server by a CS adjustment amount determined at least based on the client score of the client and the CS score propagation parameter; and generating, in response to at least updating the client score and the server score in the first iteration and the second iteration, respectively, the final scores of the plurality of endpoints based on at least the client score and the server score; and a malicious endpoint detector executing on the computer processor and configured to detect an endpoint of the plurality of endpoints as malicious in response to a corresponding one of the final scores exceeding a pre-determined threshold, wherein the endpoint is not identified as malicious based on the pre-identified endpoint threat level assigned to the endpoint; and a repository configured to store the pre-identified endpoint threat level, the pre-identified flow threat level, the SC score propagation parameter, the CS score propagation parameter, the server score, the client score, and the final scores.

9. The system of claim 8, further comprising:

an intrusion detection system (IDS) configured to determine, a binary malicious status of each of the plurality of endpoints, wherein the pre-identified endpoint threat level of the at least one endpoint is set according to at least the binary malicious status; and a flow-based classifier configured to determine the pre-identified flow threat level of each of the flows, wherein the pre-identified flow threat level represents a continuous-valued probability of each of the flows to be malicious.

10. The system of claim 8, wherein the SC score propagation parameter is normalized with respect to all pre-identified flow threat levels associated with the client, and wherein the CS score propagation parameter is normalized with respect to all pre-identified flow threat levels associated with the server.

11. The system of claim 8, the connectivity analyzer further configured to:

generate a bipartite graph to represent the plurality of endpoints and the flows among the plurality of endpoints, wherein the bipartite graph comprises server nodes, client nodes, and server/client links linking the server nodes and the client nodes according to the flows; and generate a normalized transition matrix representing the server/client links of the bipartite graph, wherein transitions in the normalized transition matrix are weighted based on corresponding pre-identified flow threat levels of the server/client links, wherein calculating, for the server and the client, the SC score propagation parameter and the CS score propagation parameter comprises computing a matrix element of the normalized transition matrix in SC direction and CS direction, respectively, and wherein the matrix element corresponds to one of the server/client links linking a server node of the server and a client node of the client.

12. The system of claim 11, the iterative score calculator further configured to:

determine the SC adjustment amount by a first matrix multiplication between a server score vector and the transition matrix in SC direction, wherein the server score vector comprises all server scores of all servers in the plurality of endpoints; and determine the CS adjustment amount by a second matrix multiplication between a client score vector and the transition matrix in CS direction, wherein the client score vector comprises all client scores of all clients in the plurality of endpoints.

13. The system of claim 8, wherein performing the iterative score propagation further comprises:

updating the client score and the server score in at least a third iteration and a fourth iteration, respectively, wherein the final scores are generated further in response to at least one selected from a group consisting of the SC adjustment amount and CS adjustment amount being less than a convergence threshold.

14. The system of claim 8, the malicious endpoint detector further configured to:

generate, in response to the detecting, an alert indicating the endpoint as malicious; and initiate, in response to the detecting, a security operation with respect to the endpoint.

15. A non-transitory computer readable medium embodying instructions for profiling network traffic of a network, the instructions when executed by a processor comprising functionality for:

obtaining, from the network, flows among a plurality of endpoints of the network, wherein the plurality of endpoints comprise servers and clients;

assigning, to each of the plurality of endpoints, a pre-identified endpoint threat level specific to each of the plurality of endpoints;

assigning, to each of the flows, a pre-identified flow threat level specific to each of the flows;

calculating, by a computer processor, for a server and a client in the plurality of endpoints, and based on the pre-identified flow threat level assigned to a flow between the server and the client, a server-to-client (SC) score propagation parameter and a client-to-server (CS) propagation parameter, performing, by the computer processor, iterative score propagation based on a sequence of iterations to generate final scores of the plurality of endpoints, wherein the iterative score propagation comprises:

initializing, prior to the sequence of iterations, a client score of the client and a server score of the server according to the pre-identified endpoint threat levels assigned to the client and the server, respectively;

updating, in a first iteration in the sequence of iterations, the client score of the client by a SC adjustment amount determined at least based on the server score of the server and the SC score propagation parameter;

updating, in a second iteration adjacent to the first iteration in the sequence of iterations, the server score of the server by a CS adjustment amount determined at least based on the client score of the client and the CS score propagation parameter; and generating, in response to at least updating the client score and the server score in the first iteration and the second iteration, respectively, the final scores of the plurality of endpoints based on at least the client score and the server score; and detecting an endpoint of the plurality of endpoints as malicious in response to a corresponding one of the final scores exceeding a pre-determined threshold, wherein the endpoint is not identified as malicious based on the pre-identified endpoint threat level assigned to the endpoint.

16. The non-transitory computer readable medium of claim 15, the instructions when executed by a processor further comprising functionality for:

identifying, using an intrusion detection system (IDS), a binary malicious status of each of the plurality of endpoints, wherein the pre-identified endpoint threat level of the at least one endpoint is set according to at least the binary malicious status; and determining, using a flow-based classifier, the pre-identified flow threat level of each of the flows, wherein the pre-identified flow threat level represents a continuous-valued probability of each of the flows to be malicious.

17. The non-transitory computer readable medium of claim 15, wherein the SC score propagation parameter is normalized with respect to all pre-identified flow threat levels associated with the client, and wherein the CS score propagation parameter is normalized with respect to all pre-identified flow threat levels associated with the server.

18. The non-transitory computer readable medium of claim 15, the instructions when executed by a processor further comprising functionality for:

generating a bipartite graph to represent the plurality of endpoints and the flows among the plurality of endpoints, wherein the bipartite graph comprises server nodes, client nodes, and server/client links linking the server nodes and the client nodes according to the flows; and generating a normalized transition matrix representing the server/client links of the bipartite graph, wherein transitions in the normalized transition matrix are weighted based on corresponding pre-identified flow threat levels of the server/client links, wherein calculating, for the server and the client, the SC score propagation parameter and the CS score propagation parameter comprises computing a matrix element of the normalized transition matrix in SC direction and CS direction, respectively, and wherein the matrix element corresponds to one of the server/client links linking a server node of the server and a client node of the client.

19. The non-transitory computer readable medium of claim 18, the instructions when executed by a processor further comprising functionality for:

determining the SC adjustment amount by a first matrix multiplication between a server score vector and the transition matrix in SC direction, wherein the server score vector comprises all server scores of all servers in the plurality of endpoints; and determining the CS adjustment amount by a second matrix multiplication between a client score vector and the transition matrix in CS direction, wherein the client score vector comprises all client scores of all clients in the plurality of endpoints.

20. The non-transitory computer readable medium of claim 15, the instructions when executed by a processor further comprising functionality for:

generating, in response to the detecting, at least one selected from a group consisting of an alert indicating the endpoint as malicious and a security operation with respect to the endpoint.

\* \* \* \* \*